United States Patent [19]

Brown

[11] Patent Number: 4,891,740

[45] Date of Patent: Jan. 2, 1990

[54] DC POWER SUPPLY WITH DIGITALLY CONTROLLED POWER SWITCH

[75] Inventor: Alan E. Brown, Magnolia, Tex.

[73] Assignee: Compaq Computer Corporation, Houston, Tex.

[21] Appl. No.: 333,775

[22] Filed: Apr. 5, 1989

Related U.S. Application Data

[63] Continuation of Ser. No. 57,535, Jun. 2, 1987, abandoned.

[51] Int. Cl.[4] .......................................... H02M 3/335
[52] U.S. Cl. ........................................ 363/21; 363/56; 363/97
[58] Field of Search ...................... 363/18–21, 363/56, 78, 79, 80, 95, 97, 131

[56] References Cited

U.S. PATENT DOCUMENTS

| | | | |
|---|---|---|---|
| 4,001,663 | 1/1977 | Bray | 321/2 |
| 4,017,745 | 4/1977 | McMahon | 323/22 |
| 4,069,449 | 1/1978 | Farnsworth | 363/28 |
| 4,092,709 | 5/1978 | Voigt et al. | 363/18 |
| 4,130,862 | 12/1978 | Holt | 363/49 |
| 4,253,137 | 2/1981 | Rao | 363/21 |
| 4,302,802 | 11/1981 | Hyde et al. | 363/21 |
| 4,323,961 | 4/1982 | Josephson | 363/56 |
| 4,400,767 | 8/1983 | Fenter | 363/21 |
| 4,499,531 | 2/1985 | Bray | 363/19 |
| 4,504,775 | 3/1985 | Becker | 320/32 |
| 4,573,112 | 2/1986 | Numata et al. | 363/19 |
| 4,608,625 | 8/1986 | Josephson et al. | 363/21 |
| 4,631,653 | 12/1986 | Small | 363/17 |

OTHER PUBLICATIONS

R. J. Boschert, "Flyback Converters: Solid–State Solution to Low–Cost Switching Power Supply", Electronics, Dec. 21, 1978, vol. 51, No. 26, pp. 100–104.

Primary Examiner—Peter S. Wong
Attorney, Agent, or Firm—J. David Cabello

[57] ABSTRACT

A discontinuous, free-running flyback power supply with precise, predictable switching control is provided. An open collector comparator provides a digital signal to the control switching transistor for precise control of the switching action of the power switching transistor. This digital signal also provides a minimum hold-off time for the power switching transistor for power-up and low load conditions.

8 Claims, 3 Drawing Sheets

DC POWER SUPPLY WITH DIGITALLY CONTROLLED POWER SWITCH

This is a continuation of co-pending application Ser. No. 057,535 filed on June 2, 1987 now abandoned.

BACKGROUND OF THE INVENTION

I. Field of the Invention

This invention relates to a power supply for driving an electronic load and more particularly to a DC power supply of the free-running flyback topology.

II. Description of the Prior Art

Off-line switching mode power supplies are commonly used in computers to achieve small size and high efficiency. The 115/230 volts (AC) input power is rectified and passed through a regulated DC-DC converter to produce the various voltages needed for logic networks, disk drives, etc. A type of regulating converter in common use is the flyback or ringingchoke type that stores energy in a multi-winding choke (power transformer) during the first half cycle and delivers this energy to the output load during the second half cycle. The storage and discharge portions of the duty cycle are generally controlled by a power transistor which acts as a switch. This transistor switch operates in the saturated and cut-off modes in response to a signal from a control transistor which is driven by an analog feedback signal.

A common form of flyback topology is the discontinuous flyback topology, in which the choke magnetic field is allowed to collapse completely after the second half cycle before a new cycle starts, leaving no energy stored in the choke. Two forms of discontinuous flyback topology are constant frequency, in which the cycle is started at regular fixed intervals, and free running, in which the new cycle starts immediately after the previous half cycle ends.

RELATED APPLICATIONS

U.S. patent application Ser. No. 057,098, filed concurrently herewith, entitled "Free-Running Flyback DC Power Supply With Current Limit Circuit" by Alan White and assigned to the same assignee as the present invention, is related to this application and is incorporated herein by reference.

BRIEF SUMMARY OF THE INVENTION.

The present invention presents quasi-digital switching control of the switching power transistor for initiation of flyback. An open collector comparator provides substantially instantaneous open or short conditions to the base of the control switching transistor which controls the switching of the power switching transistor to achieve an essentially digital, i.e., "on" - "off" switching of the power transistor.

It is therefore an object of the present invention to provide a quasi-digital control of the power switching transistor in a free-running flyback DC power supply.

It is another object of the present invention to provide for predictable power storage in the primary of the power transformer during the charge cycle for a range of input supply voltages and load conditions.

It is further an object of the present invention to provide energy storage in the power transformer primary between minimum and maximum limits without the need for power trimming.

Further objects and advantages of the present invention will become apparent to those of skill in the art as the operation of the circuit as illustrated in the attached figures is detailed below.

DESCRIPTION OF THE PREFERRED EMBODIMENT

Figure 1A:
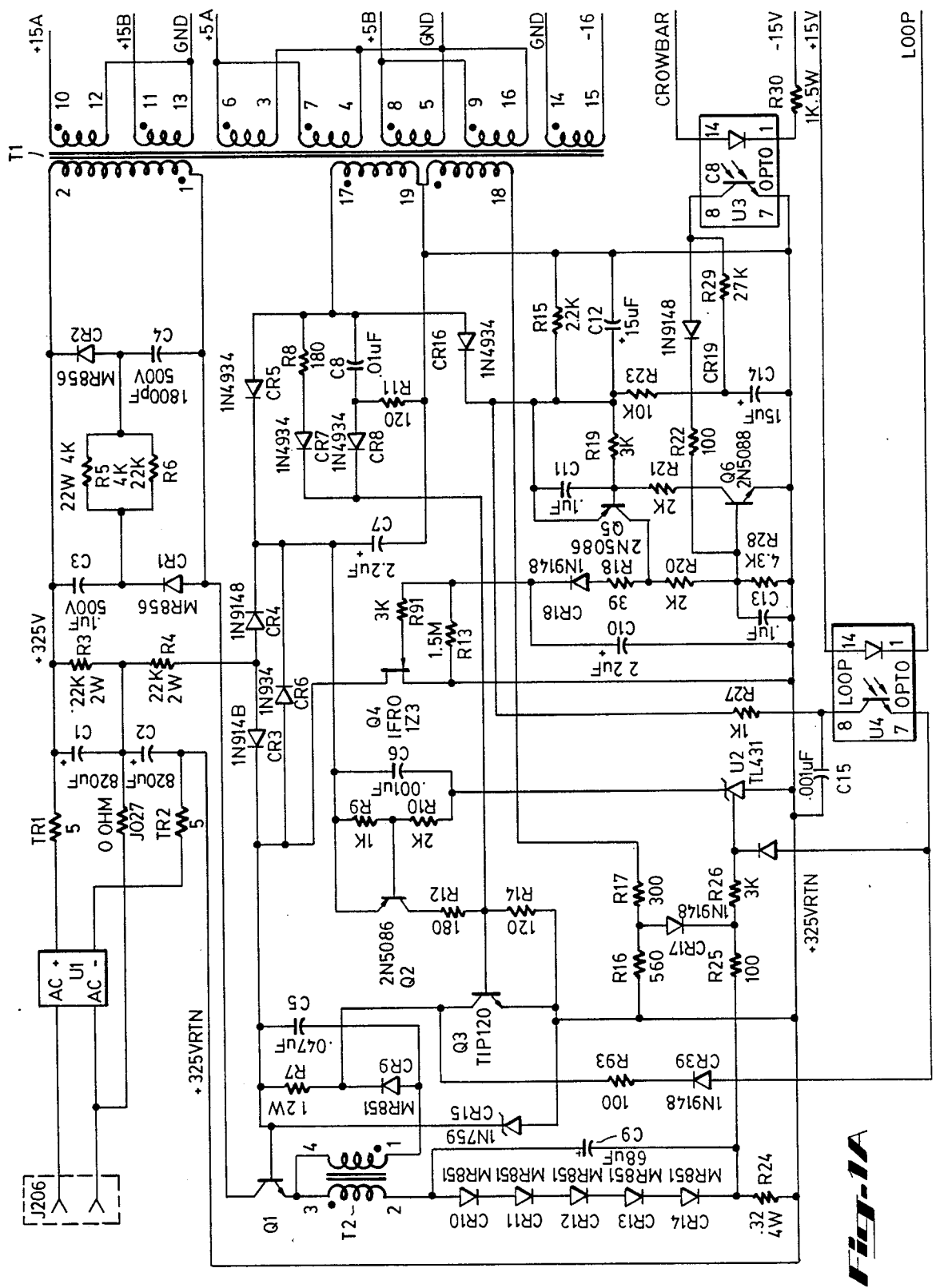
FIGS. 1A to 1C are schematic diagrams of a power supply embodying the present invention.
Figure 1B:
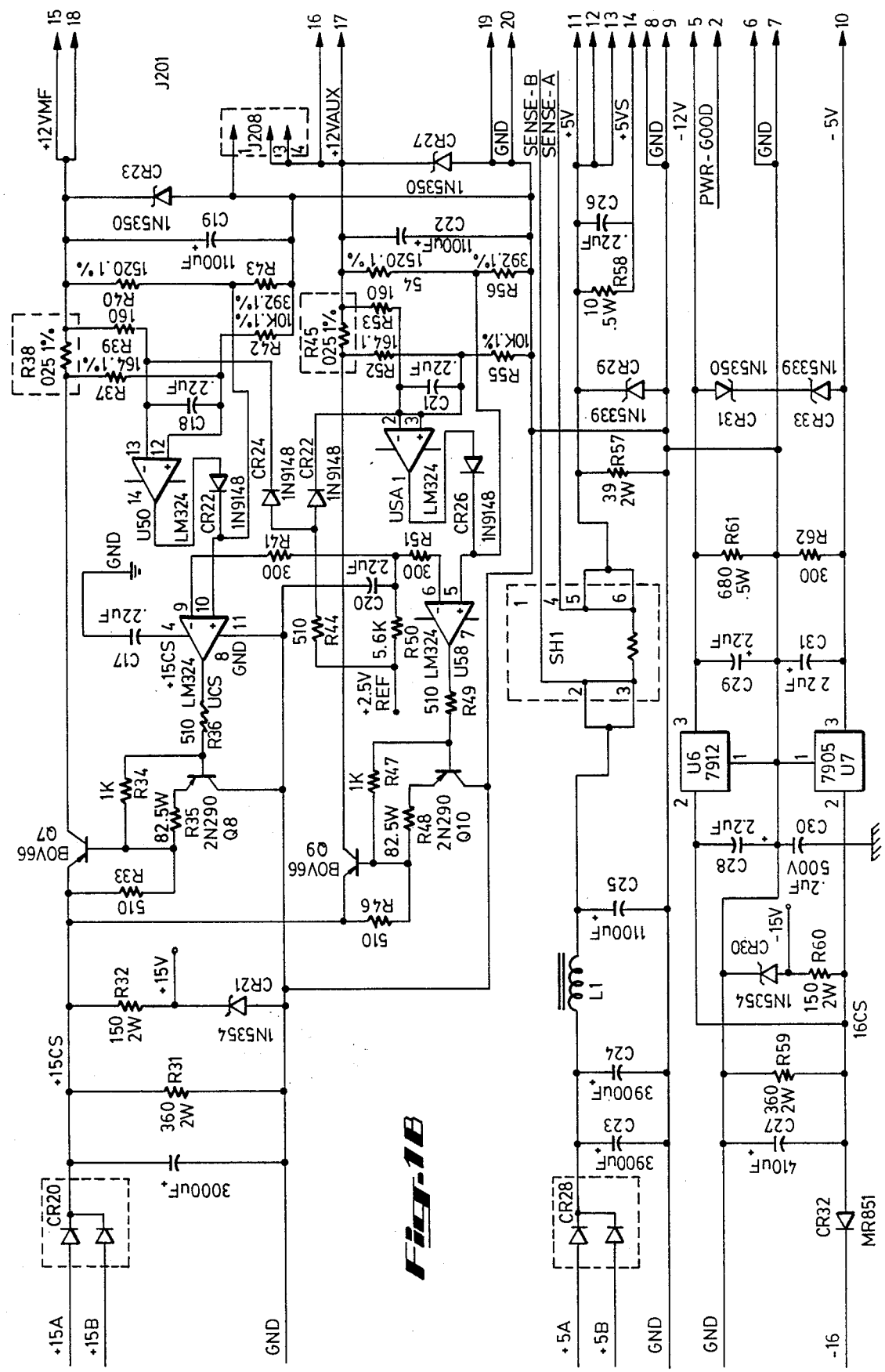
Figure 1C:
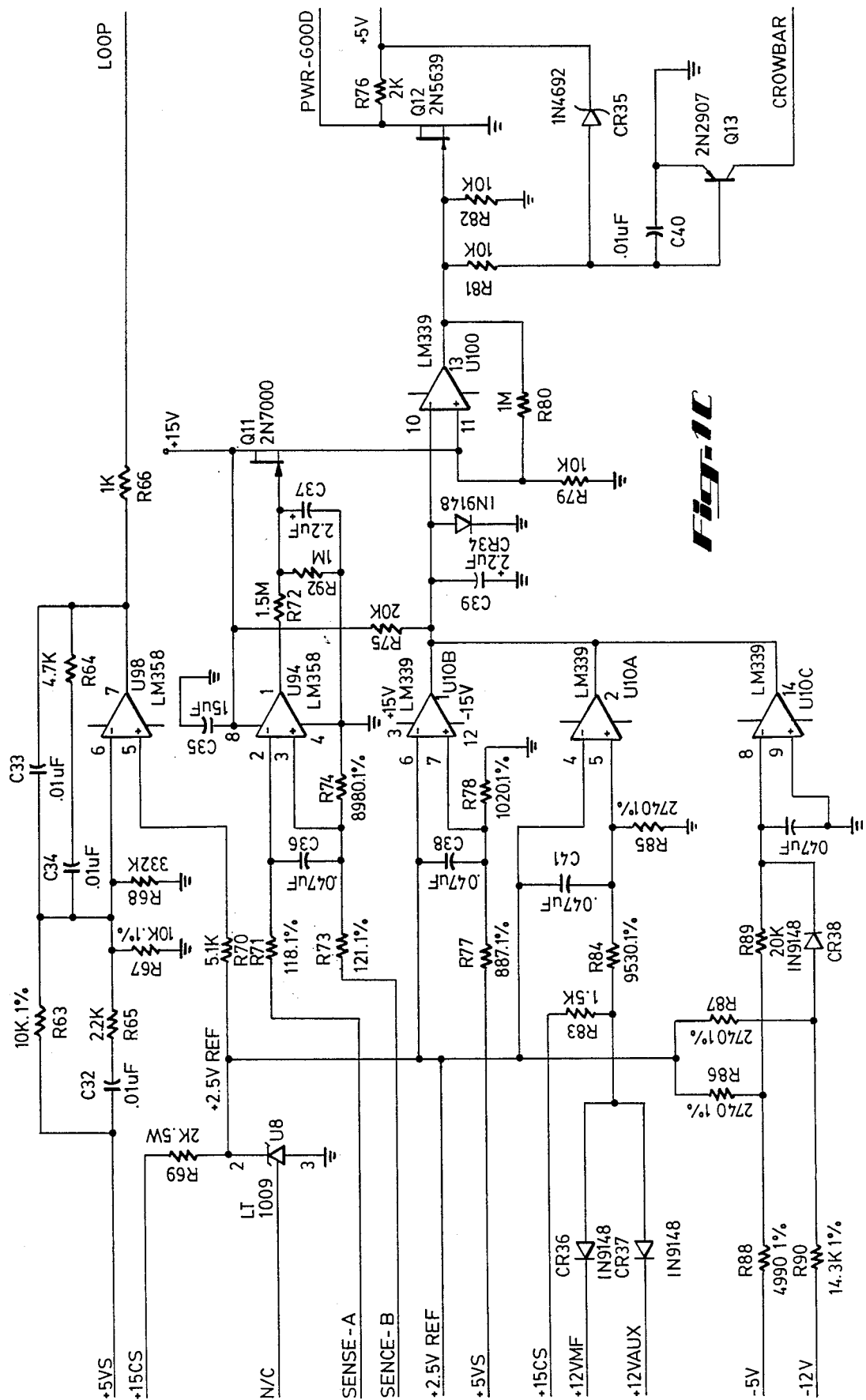

FIGS. 1A to 1C illustrate the preferred embodiment of the present invention.

The circuit is provided with unregulated DC voltage in the conventional manner by full-wave bridge rectifier U1 and the filter circuit consisting of capacitors C1 and C2 (which store the bulk of DC reservoir voltage) and resistors R3 and R4. In-rush current protection is provided by thermistors R1 and R2. Power transformer T1 stores energy in its primary windings during the charge cycle (power switching transistor Q1 conducting) and transfers this energy to its secondary windings during flyback (Q1 turned off). The rate of rise of voltage across power switching transistor Q1 is limited by the clamping and slew rate (snubber) control circuit consisting of diodes CR1 and CR2, capacitors C2 and C4 and resistors R5 and R6.

Discontinuous free-running flyback is provided by control switching transistor Q3. When Q3 conducts, the base-emitter junction of power switching transistor Q1 is back biased turning Q1 off. This initiates the flyback action in which the energy stored in the primary of power transformer T1 is transferred to its secondary.

Q3 changes states (cutoff to conduction) in response to the control signal at its base as determined by the collector current from Q2, in the preferred embodiment a P-N-P transistor. The state of transistor Q2, in turn, is controlled by shunt regulator U2, functioning in this circuit application as an open collector comparator. The external reference pin of U2 is compared to an internal voltage reference (in the preferred embodiment, 2.5 volts with initial accuracy of plus or minus 2%). The cathode to anode impedance of U2 is high when the voltage of the external reference pin is below the internal reference voltage. When the external reference voltage at the external reference pin of U2 rises above the internal reference voltage, U2 rapidly changes state and presents a low cathode to anode impedance. This change occurs almost instantaneously and hence a quasi-digital response approaching an "on" - "off" condition occurs.

For mass-produced power supply assemblies a proper amount of Q1 collector current (Ic) must be available in each power supply assembly to guarantee that neither too little nor too much power is developed in the primary of power transistor T1. In the present invention with repeatable accuracies in R24 and U2 this is possible. The signal into the external reference pin of U2 is an analog signal. The rapidly changing state of U2 cathode to anode impedance provides a quasi-digital signal to the base of Q2. When U2 conducts, the emitter-base junction of Q2 is forward biased; thus, this digital signal fires Q2 to become active, which signals Q3 to become active. When Q3 conducts, Q1 is rapidly cutoff thus limiting peak Ic at Q1 to a predetermined and repeatable peak value.

The conventional method of turning off power switching transistor Q1 via its base was to drive the control switching transistor Q3 by an analog signal. In this prior art method variations in Q3 and Q1 (such as $V_{BE}$ and $h_{fe}$ resulting from manufacturing tolerances) made a factory trim step necessary to set Q1 peak Ic. In the present invention, the variable parameters of Q3 and Q1 do not effect peak Ic of Q1. Peak Ic of Q1 is determined by establishing the external reference voltage to set a predetermined peak Ic. Once the predetermined peak Ic is reached, Q3 is digitally signaled to digitally turn Q1 off. Operation of Q1 and Q3 in this quasi-digital fashion eliminates the non-linear parameters of Q1 and Q3, during the transition phase, and thus eliminates factory trim steps previously necessary to compensate for variations in peak Ic of Q1.

To ensure the reliability of regulated power supply disclosed herein during power-up and steady-state conditions, a passive crowbar circuit is provided. This circuit is comprised of phototransistor U3, resistor R13, R15, R18–R23, R28–R29, transistors Q4–Q6 and capacitors C10–C14 and diodes CR18 and R19.

The passive crowbar circuit provides definite advantages over prior art active crowbar circuits in that the fault mode control characteristics are virtually assured since the passive crowbar circuit is available to protect the power supply as soon as C14 is charged. Thus secondary status of the power supply is not required to obtain crowbar protection since U3 operates in a failsafe mode.

In prior art active crowbar devices, crowbar protection could not be obtained until the secondary status of the power supply was established. Thus in the event of the short circuit conditions at power supply start-up (secondary state was never established) the crowbar protective circuit was never activated and resulted in power supply failure. These disadvantages are eliminated by the passive crowbar circuit of the present invention.

Referring again to FIG. 1, the operation of the crowbar circuit will depend on the indication of the photo diode in U3. During power-up, C12 is quickly charged by the potential developed across the tertiary winding 22 of power transformer T1 indicated by terminals 17 and 19 in FIG. 1. In the preferred embodiment, this is a four turn winding oriented as indicated by the standard dot convention. Also, initially during power-up C10 has no charge and transistors Q4, Q5 and Q6 are not active.

Capacitor C14 is charged slowly via R23. If all output voltages come up to their minimum values, the photo diode in U3 becomes active. This will allow the photo transistor in U3 to become active as well. As the voltage across C14 increases to approximately four volts, if U3 is not active (i.e., proper output voltages have not activated the photo diode in U3), the current through resistor R23 is conducted to the base of Q6 via CR19 and R22. This causes Q6 to conduct which fires Q5, thereby latching Q5 and Q6.

However, if C14 charges to about four volts and the phototransistor in U3 is active (indicating proper output voltages), the current through R29 is conducted via the phototransistor to the reference rail as indicated by +325 $V_{RTN}$ in FIG. 1.

If Q5 and Q6 are latched, stored charge in C12 is passed to C10 via Q5, R18 and CR18. With C10 charged, Q4 conducts shorting the base of Q1 to the reference rail, thus halting the power converter. Transistor Q4 conducts until bleeder resistor R13 drains enough charge out of C10 to cut off Q4. Q4 gate resistor R91 provides suppression of parasitic oscillations.

Bleeder resistor R15 provides a path for C12 to drain, allowing Q5 and Q6 to unlatch during the brief crowbar period (about 2.5 seconds, a portion of the RC time constant of C10 and R13). Resistor R22 is present for noise immunity and C13 and C11 provide base-emitter junction bypassng.

Comparator U2 serves an additional function. A discontinuous, free-running flyback power supply is both pulse width and frequency modulated and, in this configuration, it is desirable to have a minimum Q1 holdoff time during each power cycle.

C6, R10 and R9 are selected in a manner to accomplish a minimum turn-on time of Q2, turn-on time of Q3 and consequently turnoff time of Q1. In the preferred embodiment the turn-on time of Q2 is approximately 5 microseconds, the turn-on time of Q3 is a minimum of approximately 5 microseconds (since Q3 can also be turned on by current in the tertiary winding 22). This minimum turn-on time consequently produces a minimum turnoff time for Q1 of 5 microseconds. Such a minimum turnoff time of Q1 helps to limit peak stresses during start-up conditions and helps to better define low output loading conditions.

The flyback time of power transformer T1 normally defines the "off" time of power switching transistor Q1. In the flyback mode, T1 supplies base current to Q3 via CR7 and R8 as shown in FIG. 1. This turns Q3 on which turns Q1 off for the duration of the flyback mode.

During low load conditions, it is desirable to limit the power stored in the primary winding 21 of transformer T1. This can be done by limiting the minimum off time of Q1. This in effect limits the available power which can be transferred to the secondary by limiting the ratio of the time during which energy is being stored inthe primary of T1 and the available transfer time. This is accomplished in the present invention by the digital output signal of the U2 cathode. This signal quickly charges C6 which will hold Q2 active for a fixed minimum duration. The period during which Q2 is held active represents the minimum Q1 hold-off time. C6 will then discharge through R9 and R10 to allow Q2 to go into cutoff, terminating Q1 hold-off. It should be appreciated that this minimum hold-off time will not affect charge/flyback operation during normal load condition.

The power supply shown schematically in FIG. 1 includes a current limit circuit described more fully in simultaneously filed application entitled "Free-Running Flyback DC Power Supply With Current Limit Circuit," serial number 057,098, filed concurrently herewith, which is assigned to the same assignee as the application for the present invention and is incorporated herein by reference. In addition to this current limit circuit, the power supply circuit of the present invention further includes diode CR17. Diode CR17 limits the direction of current into the summing node formed by R25, R26 and CR17. Power transformer T1 has sensing winding (in the preferred embodiment quaternary winding 23) formed by pins 18 and 19. A fraction (as determined by the ratio of sense winding turns to primary turns) of the bulk DC reservoir voltage of C1 and C2 is impressed across pins 18 and 19 when Q1 is conducting.

With normal AC input voltages, it is desirable to source current into the summing node to provide a predetermined instantaneous limitation of Q1 peak Ic. Below normal AC input voltages it is not required to source current into the summing node but it is particularly undesirable to sink currents out of the summing node. This is precluded by diode CR17.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A regulated DC power supply comprising:
   a DC voltage source;
   a power transformer coupled to the DC source;
   a power switching transistor coupled in series with the power transformer;
   a control switching transistor coupled to the power switching transistor;
   a shunt regulator operatively coupled to the control switching transistor to provide a control signal to the control switching transistor to turn the switching transistor off in a quasi digital fashion in response to an analog reference signal; and
   a means to reverse bias the base emitter junction of the control switching transistor to turn off the power switching transistor whereby the power switching transistor is rapidly turned off to limit the peak electric current at the power switching transistor.

2. The power supply of claim 1 further comprising:
   capacitor coupled to the shunt regulator to provide a minimum turnoff time for the power switching transistor.

3. The power supply set forth in claim 1 further comprising an analog reference signal which is a function of the current flowing in the transformer.

4. The power supply set forth in claim 1 further comprising an analog reference signal for said shunt regulator which is a function of current flowing in the transformer, which is a function of an amplified error signal from the power supply secondary and/or a function of the source voltage.

5. A discontinuous, free-running flyback power supply comprising:
   an unregulated DC power source;
   a transformer coupled to the source;
   transformer switching means causing the transformer to store energy for a portion of a cycle and to transfer energy during another portion of the cycle;
   at least one control means coupled to the transformer switching means to keep the switching means in an off-condition for a predetermined period of time, said control means providing a quasi digital switching of the transformer switching means; and
   a means to reverse bias the base emitter junction of the control switching transistor to turn off the power switching transistor whereby the power switching transistor is rapidly turned off to limit the peak electric current at the power switching transistor.

6. A regulated DC power supply providing a regulated DC output voltage comprising:
   a DC voltage source;
   a power transformer, said transformer having at least a primary and a secondary winding and coupled to the DC voltage source;
   a power switching means coupled in series with the power transformer;
   at least one control switching means operatively coupled to the secondary of the power transformer to sense the voltage on the secondary winding and thereby to turn the power switching means off in response to fluctuations in load;
   a means to reverse bias the base emitter junction of the control switching transistor to turn off the power switching transsitor whereby the power switching transistor is rapidly turned off to limit the peak electric current at the power switching transistor;
   an active voltage sensing means; and
   disabling means operatively coupled between the output sensing means and the control means disabling said control means when output voltage falls below a preset minimum value and enabling said control means when output voltage rises above said preset minimum value.

7. The power supply of claim 6 wherein said active disabling means comprises:
   an optical coupler operatively coupled to the secondary side of the power transformer which is active when the secondary voltage is above the preset minimum voltage and inactive when the secondary voltage is below said preset minimum;
   an input sensing means for sensing voltage on the primary of the power transformer;
   an energy storage device which is charged by way of said input sensing means, said energy storage device having a preset threshold; and said energy storage device operatively coupled to a latching means to disable the switching means when said optical coupler detects fault mode wherein said switching means is disabled without the presence of the secondary voltage.

8. The power supply set forth in claim 7 wherein the energy storage device is a capacitor.

* * * * *